United States Patent [19]

Bressler et al.

[11] 4,204,050

[45] May 20, 1980

[54] POLYMERIZATION OF α-OLEFINS WITH A DUAL TRANSITION METAL CATALYST

[75] Inventors: Wilbur L. Bressler; Kirby Lowery, Jr.; Fred L. Vance, Jr., all of Lake Jackson, Tex.

[73] Assignee: The Dow Chemical Company, Midland, Mich.

[21] Appl. No.: 959,287

[22] Filed: Nov. 9, 1978

[51] Int. Cl.² .............................................. C08F 4/78
[52] U.S. Cl. .................................. 526/97; 252/429 B; 252/429 C; 252/431 R; 526/114; 526/125; 526/348.2; 526/348.4; 526/352
[58] Field of Search ........................ 526/97, 114, 125

[56] References Cited

U.S. PATENT DOCUMENTS

| 3,752,795 | 8/1973 | Boone | 260/88.2 |
| 3,847,957 | 11/1974 | Boone | 260/429.5 |

*Primary Examiner*—Stanford M. Levin
*Attorney, Agent, or Firm*—J. G. Carter

[57] ABSTRACT

α-olefins are polymerized with a catalyst prepared from (1) an inert support, (2) the reaction product of a tetravalent hydrocarbyloxy titanium halide such as di-n-butoxy titanium dichloride and hexavalent chromium oxide and (3) an organometal activating agent such as a tri alkyl aluminum.

6 Claims, No Drawings

POLYMERIZATION OF α-OLEFINS WITH A DUAL TRANSITION METAL CATALYST

BACKGROUND OF THE INVENTION

The present invention concerns compositions useful in the preparation of catalysts, the catalysts and the polymerization of olefins employing these catalysts.

Dual transition metal compounds containing both chromium and titanium have been employed in the preparation of catalysts for olefin polymerization in U.S. Pat. Nos. 3,752,795 and 3,847,957. Such dual transition metal compounds are formed by reacting a tetraorgano titanate with chromium oxide.

It has now been discovered that compounds prepared from chromium oxide and a tetravalent organoxy titanium halide can be employed in catalysts suitable for the polymerization of olefins.

SUMMARY OF THE INVENTION

One aspect of the present invention concerns dual transition metal compounds which are the reaction product of chromium oxide and a tetravalent hydrocarbyloxy titanium halide.

Another aspect of the present invention concerns a catalyst for polymerizing α-olefins which comprises (a) the aforementioned reaction product, (b) a solid catalyst support and (c) an organometallic activating agent or cocatalyst.

Another aspect of the invention is a process for polymerizing α-olefins which comprises conducting the polymerization in the presence of the aforementioned catalyst.

DETAILED DESCRIPTION OF THE INVENTION

Suitable titanium compounds which can be employed in the preparation of the compounds of the present invention containing both chromium and titanium include those represented by the formula $(RO)_n TiX_{4-n}$ where R is a monovalent hydrocarbyl group, X is a halogen such as chlorine, bromine, iodine, preferably chlorine or bromine, and n has a value of from 1 to 3, preferably 2.

These titanium compounds are readily prepared by the simple admixture of a titanium tetrahalide ($TiX_4$) and a titanate ($Ti(OR)_4$), preferably in the presence of an inert solvent. The reaction proceeds presumably according to the following chemical equation

$$nTi(OR)_4 + (4-n) TiX_4 \rightarrow 4Ti(OR)_n X_{4-n}$$

This reaction is given in *THE ORGANIC CHEMISTRY OF TITANIUM*, Raoul Feld and Peter L. Cowe, Butterworth & Co. (Publishers) Ltd., 1965, pp 49 illustrating chlorine as the halogen.

The term hydrocarbyl as employed herein means alkyl, cycloalkyl aryl, aralkyl, alkenyl and similar hydrocarbon radicals having from 1 to about 20 carbon atoms with alkyl having from 1 to about 10 being especially preferred.

Particularly suitable tetravalent titanium compounds include, for example,
dibutoxy titanium dichloride,
dibutoxy titanium dibromide,
diethoxy titanium dichloride,
diethoxy titanium dibromide,
dipropoxy titanium dichloride,
dipropoxy titanium dibromide,
diphenoxy titanium dichloride,
diphenoxy titanium dibromide,
ethoxy titanium trichloride,
ethoxy titanium tribromide,
propoxy titanium trichloride,
propoxy titanium tribromide,
butoxy titanium trichloride,
phenoxy titanium trichloride,
phenoxy titanium tribromide,
triethoxy titanium chloride,
triethoxy titanium bromide,
tripropoxy titanium chloride,
tripropoxy titanium bromide,
tributoxy titanium chloride,
tributoxy titanium bromide,
triphenoxy titanium chloride,
triphenoxy titanium bromide,
mixtures thereof and the like.

The chromium oxide employed is hexavalent chromium oxide, $CrO_3$.

The reaction between the hydrocarbyloxy titanium compound and the chromium oxide is preferably carried out in the presence of a suitable hydrocarbon solvent or diluent as hereinafter defined at temperatures of from about 0° C. to about 120° C., preferably from about 20° C. to about 90° C. at pressures of from about 1 atm to about 100 atm. The reaction is most preferably conducted at a temperature of from about 25° C. to about 50° C. at atmospheric pressure e.g. 14.7 psi (1.03 kg/cm²). The time of course depends upon the particular temperature being employed and is for a time to sufficiently complete the reaction usually from about 30 minutes to about 72 hours preferably from about 1 hour to about 24 hours.

The molar ratios of chromium oxide to hydrocarbyloxy titanium halide is from about 0.25:1 to about 6:1, preferably from about 0.5:1 to about 2:1. At ratios lower than 0.25:1 very small amounts of product is formed and at quantities above about 6:1 quantities of chromium oxide is wasted.

While the exact structure of the reaction product is not known, it is believed to be that represented by the formulas

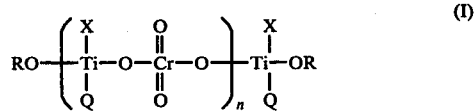

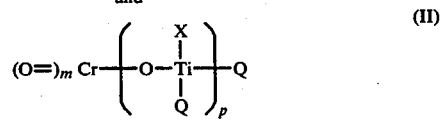

wherein each Q is independently a halogen atom or an —OR group, each X is independently a halogen atom, each R is independently a hydrocarbyl group as hereinbefore defined, n has an average value of from 1 to about 6, preferably from about 1 to about 2, m has an average value of from zero to 2, preferably 1 to 2, p has an average value of from 1 to 6, preferably from 2 to 4 and wherein 2m+p is equal to the valence of chromium.

The preferred reaction products are those which are hydrocarbon soluble e.g. those wherein the average value of n is less than about 5, preferably less than about 3.

Suitable inert solid support materials which can be employed herein include, for example, silica, titania, zirconia, magnesium oxide, zinc chloride, magnesium chloride mixtures thereof and the like.

A particularly suitable inert support material is one which is prepared by reacting an organomagnesium component with a halide source.

A suitable organomagnesium component is a hydrocarbon soluble complex illustrated by the formula $MgR''_2 \cdot xMR''_y$ wherein each $R''$ is independently hydrocarbyl or hydrocarbyloxy, M is aluminum, zinc or mixtures thereof and x is about 0.001 to 10, especially from about 0.15 to about 2.5 and y denotes the number of hydrocarbyl groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. Hydrocarbyl is preferred over hydrocarbyloxy. This complex is prepared by reacting particulate magnesium such as magnesium turnings, or magnesium particles with about a stoichiometric amount of hydrocarbyl or hydrocarbyloxy halide, illustrated as R'X. The resulting hydrocarbon insoluble $MgR''_2$ is solubilized by adding the organometallic compound such as $AlR''_3$ or mixtures thereof with $ZnR''_2$. The amount of organometallic compounds which is added to the $MgR''_2$ to form the organomagnesium complex should be enough to solubilize a significant amount of $MgR''_2$, e.g., at least 5 weight percent of $MgR''_2$ is solubilized. It is preferred to solubilize at least 50 weight percent of the $MgR''_2$ and especially preferred to solubilize all the $MgR''_2$. When employing a mixture of $AlR''_3$ and $ZnR''_2$ to solubilize $MgR''_2$, the atomic ratio of Zn to Al is from about 3000:1 to about 0.1:1, preferably from about 350:1 to about 1:1. In order to obtain maximum catalyst efficiency at polymerization temperatures above 180° C., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1. In suitable complexes, organometallic compounds (other than $AlR''_3$, $ZnR''_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorous compounds.

Alternative to the aforementioned solubilized magnesium complexes, it is also advantageous to employ organomagnesium compounds as the organomagnesium component. Such compounds, although often insoluble in hydrocarbons, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon soluble organomagnesium compounds are the most desirable if an organomagnesium compound is to be used as the organomagnesium component.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein alkyl has from 1 to 20 carbon atoms. Exemplary suitable magnesium diaryls include diphenylmagnesium, dibenzylmagnesium, and ditolylmagnesium, being especially preferred. Suitable organomagnesium compounds include alkyl and aryl magnesium alkoxides and aryloxides and aryl and alkyl magnesium halides with the halogen-free organomagnesium compounds being more desirable.

The halide source is suitably a non-metallic halide corresponding to the formula R'X wherein R' is hydrogen or an active monovalent organic radical and X is halogen. Alternatively, the halide source is a metallic halide corresponding to the formula $MR_{y-a}X_a$ wherein M is a member of groups IIB, IIIA or IVA of Mendeleev's Periodic Table of the Elements, R is a monovalent organic radical usually hydrocarbyl or hydrocarbyloxy, X is halogen, y is a number corresponding to the valence of M and a is a number from 1 to y.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride preferably as active as t-butyl chloride. In addition to the organic monohalides, it is understood that organic dihalides, trihalides and other polyhalides that are active as defined hereinbefore as also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides as set forth by formula hereinbefore are organometallic halides and metal halides wherein the metal is in Group IIB, IIIA or IVA, of Mendeleev's Periodic Table of Elements. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

A sufficient quantity of the halide source is employed so as to provide a small amount in excess of that required to completely react with the support metal compound in those instances where the support metal compound is reactable therewith such as reacting a dialkyl magnesium compound with a halide source.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent in the following especially preferred order: (1) Ms compound and halide source, (2) Mr compound and (3) transition metal compound. Ms and Mr are hereinafter defined.

The foregoing catalytic reaction product is preferably carried out in the presence of an inert diluent or solvent. The concentrations of catalyst components are preferably such that when the essential components of the catalytic reaction product are combined, the resultant slurry is from about 0.005 to about 1.0 molar (moles/liter) with respect to magnesium.

By way of an example of suitable inert organic diluents or solvents can be mentioned liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogne, argon or other inert gas at temperatures in the range from about $-100°$ to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the catalysts of the present invention, the components are employed in quantities so as to provide the following atomic ratios.

Ms:Ti atomic ratio is from about 0.1:1 to about 1000:1, preferably from about 10:1 to about 100:1 and most preferably from about 20:1 to about 40:1.

Mr:Ti atomic ratio is from about 0.3:1 to about 2000:1, preferably from about 1:1 to about 100:1 and most preferably from about 10:1 to about 50:1.

When the inert support is prepared by reacting an organomagnesium compound with a halide source, then the Ms is defined as the metal content of the inert solid support such as Zn, Si, Ti, Zr, Mg and the like.

XsX:Mr atomic ratio is from about 0.01:1 to about 100:1, preferably from about 0.1:1 to about 10:1 and most preferably from about 0.4:1 to about 1:1.

Mr is defined as the metal of the organometallic activating agent or cocatalyst.

XsX is defined as the excess halide above that which would be theoretically required to convert the magnesium compound or other reactable support compound to the corresponding halide.

In those instances where the halide source does not contain a reducing metal such as aluminum or contains an insufficient quantity thereof, then an organometallic compound is added so as to provide the desired quantity of reducing metal (Mr).

The organometallic activating agent or cocatalyst is suitably any reducing component commonly employed in Ziegler polymerization. For example, the cocatalyst may be any organometallic reducing compounds employed in conventional Ziegler polymerization, preferably an alkyl aluminum compound having at least two alkyl groups per aluminum, e.g., aluminum trialkyls or dialkyl aluminum halides. Examples include aluminum triethyl, aluminum triisobutyl, aluminum tripropyl, aluminum trimethyl, diethyl aluminum chloride and others wherein alkyl has from 1 to 12 carbons and halide is preferably chloride or bromide. Preferably, the organometallic reducing compound is present in concentrations sufficient to provide an atomic ratio of reducing metal to transition metal in the range from about 0.3:1 to about 2000:1, preferably from about 1:1 to about 100:1, especially from about 10:1 to about 50:1.

Such activating agents or cocatalysts are generated in situ when an aluminum alkyl halide is employed as the halide source in the preparation of the inert solid support from an organomagnesium compound such as a dihydrocarbyl magnesium compound.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., preferably at solution polymerization temperatures, e.g., from about 130° to about 250° C. for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent or excess monomer, is generally employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 600 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this, when an excess of ethylene is fed into the system, a portion of the ethylene can be vented.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present and thus removing the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively broad molecular weight distribution.

The following examples are given to illustrate the invention, and should not be construed as limiting its scope. All parts and percentages are by weight unless otherwise indicated.

The following atomic weight values were employed in the examples to calculate the ratios of the components.
Al=26.98
C=12.01
Cr=52.00
Cl=35.45
H=1.01
Mg=24.31
Ni=58.71
O=16.00
Ti=47.90.

In the following examples, the melt index values $I_2$ and $I_{10}$ were determined by ASTM D 1238-70 and the density values were determined by ASTM D 1248.

EXAMPLE 1

A. Preparation of Dual Transition Metal Compound

In a nitrogen filled dry box 3.4 ml (0.01 mole) of tetra-n-butyl titanate and 1.1 ml (0.01 mole) of titanium tetrachloride were added to 50 ml of Isopar ® E (a mixture of $C_7$-$C_9$ hydrocarbon) in a 500 ml reaction flask. Two grams (0.02 mole) of powdered chromium (VI) oxide ($CrO_3$) was then added to the reaction flask followed by an additional 50 ml of Isopar ® E. The reaction flask was sealed and removed from the dry box to a lab hood. The flask was fitted with a condenser and a nitrogen inlet means. The contents were heated at 50° C. to 60° C. for 24 hours under a nitrogen atmosphere. The resultant red-brown solution was filtered from a pink precipitate in a nitrogen filled dry box. The red-brown filtrate was found to contain by X-ray emission spectroscopy and titrimetric (with silver nitrate) analysis, 0.95% Ti, 0.13% Cr and 1.12% Cl. All percents being by weight.

B. Preparation of Dual Transition Metal Compound

The procedure of A above was repeated with the filtrate analysis being 0.95% Ti, 0.11% Cr and 0.63% Cl.

C. Preparation of Dual Transition Metal Compound

The procedure of A above was repeated employing 2.98 ml (0.01 mole) of tetraisopropyl titanate in place of 3.4 ml (0.01 mole of tetra-n-butyl titanate. After 5 hours of reaction, the product was predominately a brown precipitate. The reaction mixture was filtered in a dry box yielding a brown powder and a clear yellow solution. The brown powder was found, after analysis, to contain 24% Ti, 8.2% Cr and 15.2% Cl, all percents being by weight.

D. Preparation of Catalyst

In a nitrogen filled dry box, a 4 oz (118.28 cc) catalyst bottle containing 95.5 ml of Isopar ® E was added 1.5 ml (0.75 millimole) of a 0.5 M solution of ethyl aluminum dichloride in Isopar ® E. While stirring, 1.5 ml (0.6 millimole) of 0.4 M di-n-hexyl magnesium was added followed by the addition of 1.5 ml of a mixture prepared from 5 ml of the filtrate from A above and 95 ml of Isopar ® E. The catalyst bottle was fitted with a rubber septum and removed from the dry box. The catalyst had the following atomic ratios: 536 Al, 429 Mg, 8 Ti and 1 Cr.

E. Preparation of Catalyst

The procedure of D above was repeated employing 3 ml of the diluted filtrate from Ainstead of 1.5 ml. The atomic ratios of the resultant catalyst was 268 Al, 214 Mg, 8 Ti and 1 Cr.

F. Polymerization

To a stirred 5 liter batch reactor at 150° C. containing 2 liters (20 psig vapor pressure) of Isopar ® E purified by passing through molecular sieves was added 1 psig of chromatographic grade hydrogen and 175 psig of ethylene which was purified by passing through molecular sieves. 20 ml of the slurried catalyst from D above containing 12 mg of solid catalyst was syringed into a 75 ml pressure bomb under a nitrogen purge. The bomb was then pressured to 250 psig and the catalyst vented into the reactor where the ethylene was polymerized at 150° C. for 31 minutes. The polymer was removed from the reactor and dried in a vacuum oven at 80° C. The 65 grams of recovered polymer had an $I_2$ melt index of 0.18, an $I_{10}$ melt index of 3.78, an $I_{10}/I_2$ of 21.0, a density of 0.9762 and a catalyst efficiency of 5416.7 g polymer per g of solid catalyst or 616,000 g polymer per g of Ti.

G. Polymerization

The procedure of F above was followed except that 25 ml of the slurried catalyst prepared in D above containing 15 mg of solid catalyst was employed and the polymerization was conducted for 34 minutes.

The resultant 49 grams of polymer had a melt index $I_2$ of 1.17, an $I_{10}$ melt index of 13.53, an $I_{10}/I_2$ ratio of 11.56, a density of 0.950, a catalyst efficiency of 3266 g of polymer per g of solid catalyst or 371,000 g of polymer per g of Ti.

H. Polymerization

The procedure of F above was employed except that the temperature was 140° C. which provided a solvent vapor pressure of about 15 psig, about 2 psig of hydrogen was added to the reactor and 15 ml (9.5 mg of solid catalyst) of the catalyst slurry from E above was employed at a polymerization time of 34 minutes.

The resultant 89 g of recovered polymer had a melt index $I_2$ of 1.21, a melt index $I_{10}$ of 10.15, an $I_{10}/I_2$ ratio of 8.39, a density of 0.9696, and a catalyst efficiency of 9368.42 g of polymer per gram of solid catalyst or 563,000 g of polymer per g of Ti.

I. Polymerization

The procedure of F above was employed except that the temperature employed was 170° C. which provided a solvent vapor pressure of about 35 psig, about 2 psig hydrogen was employed and 20 ml (12.7 mg of solid catalyst) of the slurried catalyst of E above was employed. The polymerization was conducted for 38 minutes. The 22 grams of recovered polymer had a melt index $I_2$ of 5.46, a melt index $I_{10}$ of 45.10, an $I_{10}/I_2$ ratio of 8.26, a density of 0.9557 and a catalyst efficiency of 1732.28 g of polymer per g of solid catalyst or 105,600 g of polymer per g of Ti.

We claim:

1. A process for polymerizing α-olefins which comprises subjecting one or more α-olefins to Ziegler polymerization conditions in the presence of a catalyst comprising (a) an inert solid catalyst support containing a metal Ms selected from Mg, Zn, Zr, Si, Ti and mixtures thereof;
(b) the reaction product of a tetravalent hydrocarbyloxy titanium halide or mixture of such compounds and $CrO_3$ in a mole ratio of $CrO_3$ to hydrocarbyloxy titanium halide of from about 0.25:1 to about 6:1; and
(c) an organometallic activating agent containing aluminum; and wherein the atomic ratio of Ms:Ti is from about 0.1:1 to about 1000:1; the atomic ratio of Al:Ti is from about 0.3:1 to about 2000:1.

2. The process of claim 1 wherein
(1) said solid catalyst support is the reaction product of an organomagnesium compound and a halide source;
(2) said hydrocarbyloxy titanium halide is a compound or mixture of compounds represented by the formula $(RO)_n TiX_{4-n}$ wherein each R is independently a hydrocarbyl group having from one to about 20 carbon atoms, X is chlorine or bromine and n has a value of from 1 to 3;
(3) said mole ratio of $CrO_3$ to hydrocarbyloxy titanium compound is from about 0.5:1 to about 2:1, and
(4) said organometallic activating agent or cocatalyst is an aluminum trialkyl a dialkyl aluminum halide or mixture thereof wherein said alkyl groups independently have from 1 to about 12 carbon atoms; and wherein the atomic ratio of Mg:Ti is from about 10:1 to about 100:1; the atomic ratio of Al:Ti is from about 1:1 to about 100:1 and the atomic ratio of XsX:Al is from about 0.01:1 to about 100:1.

3. The process of claim 2 wherein
(1) said organomagnesium compound is a hydrocarbon soluble dialkyl magnesium compound;
(2) said halide source is an aluminum alkyl halide;
(3) in the formula representing the hydrocarbyloxy titanium compound, each R is independently an alkyl group having from 1 to about 10 carbon atoms and n has a value of 2; and
(4) said activating agent or cocatalyst is generated in situ from the reaction of the dialkyl magnesium compound with the aluminum alkyl halide; and wherein
the atomic ratio of Mg:Ti is from about 20:1 to about 40:1; the atomic ratio of Al:Ti is from about 10:1 to about 50:1 and the atomic ratio of XsX:Al is from about 0.01:1 to about 10:1.

4. The process of claim 3 wherein
(1) said organomagnesium compound is di-n-hexyl magnesium;
(2) said halide source is ethyl aluminum dichloride; and
(3) in the formula for the hydrocarbyloxy titanium halide, each R is n-butyl or isopropyl and each X is chlorine; and wherein the XsX:Al ratio is from about 0.4:1 to about 1:1.

5. The process of claims 1, 2, 3, or 4 wherein the α-olefin is ethylene or a mixture of ethylene and a higher α-olefin and/or other ethylenically polymerizable compound and the process is conducted under solution polymerization conditions.

6. The process of claim 5 wherein a mixture of ethylene and hexene or octene is polymerized.

* * * * *